US010841116B2

(12) United States Patent
Heins et al.

(10) Patent No.: US 10,841,116 B2
(45) Date of Patent: Nov. 17, 2020

(54) SYSTEM AND METHOD FOR STORING AND RETRIEVING MEETING AND PRESENTATION EFFECTIVENESS DATA

(71) Applicant: International Business Machines Corporation, Armonk, NY (US)

(72) Inventors: Jennifer Heins, Raleigh, NC (US); Marshall Lamb, Raleigh, NC (US); Laura Janet Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 16/044,060

(22) Filed: Jul. 24, 2018

(65) Prior Publication Data

US 2020/0036547 A1 Jan. 30, 2020

(51) Int. Cl.
| | | |
|---|---|---|
| *H04L 12/18* | (2006.01) | |
| *G06F 16/48* | (2019.01) | |
| *G06F 16/438* | (2019.01) | |
| *H04L 29/08* | (2006.01) | |
| *G06F 16/954* | (2019.01) | |
| *G06F 16/44* | (2019.01) | |
| *H04L 12/58* | (2006.01) | |
| *H04L 29/06* | (2006.01) | |

(52) U.S. Cl.
CPC ........ *H04L 12/1831* (2013.01); *G06F 16/438* (2019.01); *G06F 16/48* (2019.01); *G06F 16/44* (2019.01); *G06F 16/954* (2019.01); *H04L 51/34* (2013.01); *H04L 65/403* (2013.01); *H04L 67/22* (2013.01); *H04L 67/30* (2013.01); *H04L 67/306* (2013.01)

(58) Field of Classification Search
CPC ......... H04L 51/32; H04L 67/30; H04L 67/22; H04L 67/306; H04L 51/34; H04L 65/403; H04L 12/1831; G06F 16/435; G06F 16/907; G06F 9/4843; G06F 3/1454; G06F 3/165; G06F 3/0481; G06F 16/48; G06F 16/438; G06F 16/954; G06F 16/44
See application file for complete search history.

(56) References Cited

U.S. PATENT DOCUMENTS

| | | | |
|---|---|---|---|
| 8,285,761 B2 | 10/2012 | Gupta et al. | |
| 2004/0002993 A1 | 1/2004 | Toussaint et al. | |
| 2006/0026593 A1* | 2/2006 | Canning | G06F 9/4843 |
| | | | 718/100 |
| 2008/0097985 A1* | 4/2008 | Olstad | G06F 16/907 |
| 2010/0332440 A1* | 12/2010 | Brodsky | G06Q 30/02 |
| | | | 706/52 |

(Continued)

FOREIGN PATENT DOCUMENTS

WO 2008005493 1/2008

*Primary Examiner* — Jungwon Chang
(74) *Attorney, Agent, or Firm* — L. Jeffrey Kelly

(57) ABSTRACT

A method, system and computer program product for storing and retrieving meeting and presentation effectiveness data. The effectiveness data for material associated with the meeting or presentation is collected, and the effectiveness data is stored as feedback metadata in a file with the material. The feedback metadata comprises an updateable and searchable record of the effectiveness data for the material, thereby allowing a user to search the material based on the effectiveness data as well as its content.

17 Claims, 4 Drawing Sheets

(56) References Cited

U.S. PATENT DOCUMENTS

| | | |
|---|---|---|
| 2013/0227420 A1 | 8/2013 | Pasquero et al. |
| 2014/0074866 A1 | 3/2014 | Shah et al. |
| 2015/0066897 A1* | 3/2015 | Vronay ................. G06F 16/435 |
| | | 707/710 |
| 2015/0347560 A1 | 12/2015 | Skrobotov |
| 2016/0021412 A1 | 1/2016 | Zito, Jr. |
| 2016/0188572 A1 | 6/2016 | Clark et al. |
| 2016/0266864 A1* | 9/2016 | Rajendran ............. G06F 3/1454 |
| 2018/0145840 A1* | 5/2018 | Advani ............... H04L 12/1822 |
| 2018/0268038 A1* | 9/2018 | Keyngnaert ......... G06Q 10/063 |

* cited by examiner

SYSTEM AND METHOD FOR STORING AND RETRIEVING MEETING AND PRESENTATION EFFECTIVENESS DATA

BACKGROUND

The present invention relates generally to a method and system for storing and retrieving meeting and presentation effectiveness data.

The value of a meeting or presentation starts to depreciate immediately after the event and continues to drastically reduce in value over time as material associated with the meeting or presentation becomes irretrievable or loses relevance.

Additionally, as there are often meetings or presentations on similar topics, merely storing the meeting or presentation material in a searchable content repository is typically not enough to find the most popular, relevant, and useful content among many choices.

Moreover, the popularity of the material relies on consumers explicitly tagging or voting on the material that they find particularly useful, resulting in an inconsistent scoring system.

Finally, the meeting or presentation material is often archived as video recordings, which makes it difficult to index the material for relevant content.

Thus, there is a need in the art for a mechanism for storing and retrieving meeting and presentation effectiveness data in order to enhance the value of the material associated with the meeting or presentation.

SUMMARY

The invention provided herein has many embodiments useful, for example, in implementing a method, system and computer program product for storing and retrieving meeting and presentation effectiveness data. The effectiveness data for material associated with the meeting or presentation is collected, and the effectiveness data is stored as feedback metadata in a file with the material. The feedback metadata comprises an updateable and searchable record of the effectiveness data for the material, thereby allowing a user to search the material based on the effectiveness data as well as its content.

BRIEF DESCRIPTION OF THE DRAWINGS

Referring now to the drawings in which like reference numbers represent corresponding parts throughout.

DETAILED DESCRIPTION

Figure 1:
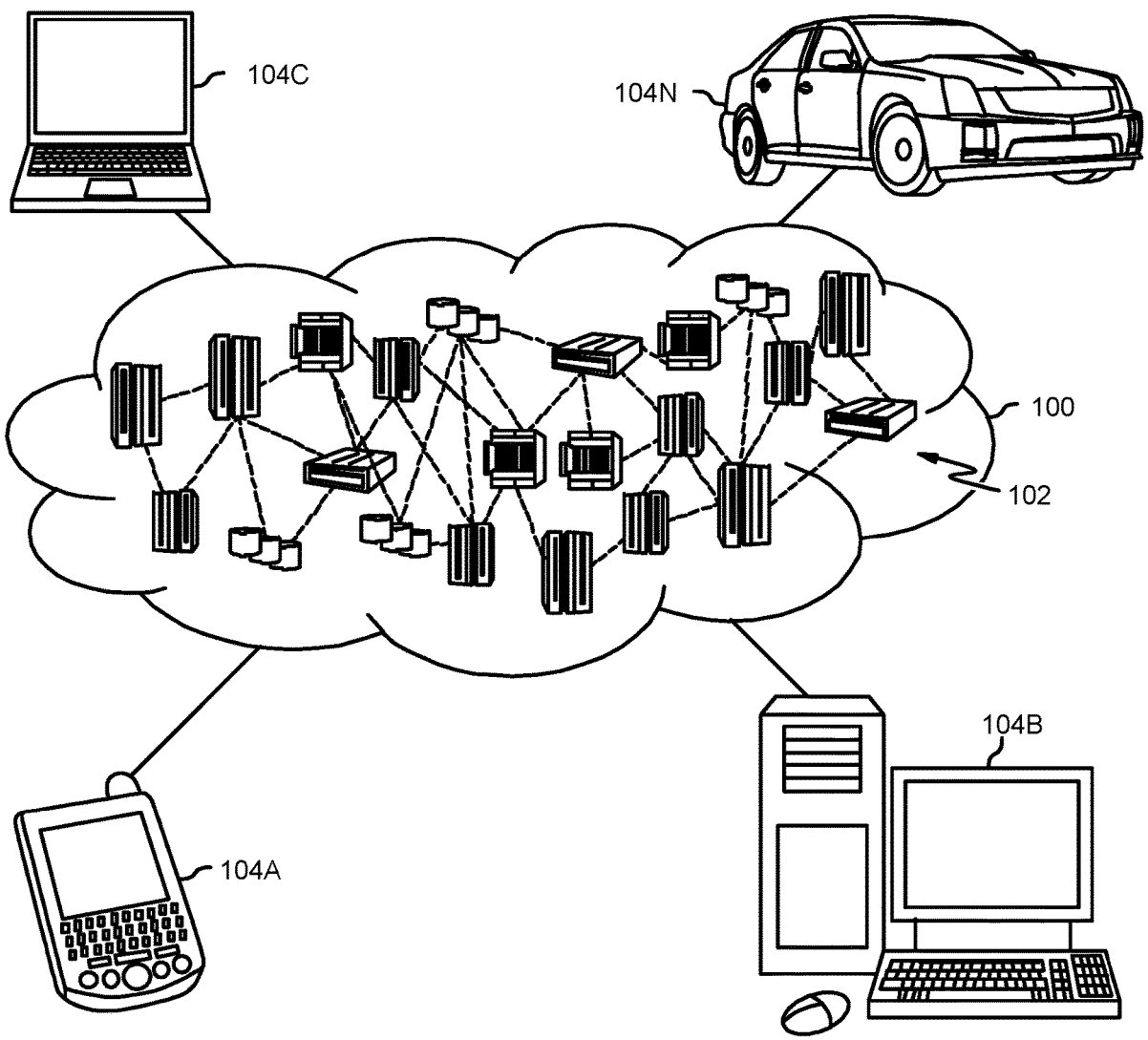
FIG. 1 is a pictorial representation of an illustrative cloud computing environment used for implementing a system for storing and retrieving meeting and presentation effectiveness data, according to one embodiment.

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

The present invention provides for a system and method for storing and retrieving meeting and presentation effectiveness data. Specifically, this invention introduces the concept of feedback metadata that is included in a file along with meeting or presentation material of various formats (documents, presentations, audio, video, etc.). The feedback metadata stores the effectiveness data for the meeting or presentation material.

Material associated with meetings or presentations is typically comprised of various media formats, such as documents, slide presentations, audio, video, etc. The meeting or presentation material may be stored in one or more files having a specified format based on the type of media.

Generally, the files have associated metadata, such as date created, date of last modification, owner, keywords, etc. In this invention, the files also have feedback metadata. The feedback metadata stores the effectiveness data, which describes the relevance of the content, as determined by active and/or passive user feedback.

One aspect of this invention is how the feedback metadata is generated. For example, the effectiveness data may include, but is not limited to, the following:

Live meeting or presentation feedback, such as a numeric score (1-100), representing the value of the meeting or presentation material based on aggregating feedback from an audience during the actual event, wherein the scores are averaged over each event where the meeting or presentation material is used.

Tagging or voting associated with a file in one or more content repositories.

Ratings accumulated or averaged across each content repository where a file is stored.

The number of views or downloads of a file from one or more content repositories.

The number of copies made from a file.

The number of times one or more portions of a file have been bookmarked.

The most popular portions of a file, such as pages of a document or time-frames of audio or video, based on user behavior, such as the copying and pasting of content, or the pausing and resuming of audio or video in playback mode. In one embodiment, only a specified number of the most popular portions of the file, e.g., the top 5, may be identified in the feedback metadata.

The recency of any activity for a file, or any other actions related to the file.

Specifically, the effectiveness data is based on user behavior with the material itself, and is not based solely on search results. Moreover, the effectiveness data is derived for a plurality of different types of material.

By storing the feedback metadata with the meeting or presentation material, the feedback metadata comprises a dynamic and searchable record of the effectiveness data gathered for the meeting or presentation material over its life span. The feedback metadata allows a user to search for relevant content, not just based on indexed content in the material, but also based on how valuable others found the content in the material as well.

For example, the feedback metadata may include relevance scores for keywords found within the material that enhance other search criteria. Users are thereby more easily able to find relevant meeting or presentation material based on how useful other users found the material. End users can search for relevant meeting and presentation material not only using a keyword search, but also using the material's usefulness, relevance and value provided through the effectiveness data.

In one embodiment, any time a relevant action is taken with regard to the meeting or presentation material, the feedback metadata is created and/or updated to reflect that action's effect on the material. Applications that access the meeting or presentation material will need to support creating and/or updating the feedback metadata based on the relevant actions.

Search engines can aggregate or average the feedback metadata across multiple copies of the meeting and presentation material found in different repositories. In one embodiment, copies of the meeting and presentation material may be identified by a unique identifier for a file across all copies of that file.

Owners of the meeting and presentation material also now have a way to track the usefulness, relevance and value of the meeting and presentation material over its lifespan, allowing them to adjust the meeting and presentation material.

For example, content repositories can also use such feedback metadata to assist with archiving the material. For content repositories, storage tends to be a large cost component. Data easily accumulates over time, and as relevancy diminishes over time, irrelevant data will quickly consume storage, creating a largely unnecessary cost burden. The feedback metadata described by this invention gives content repositories the metrics necessary to decide what to do with the material.

Options include, but are not limited to, the following:

Data culling: Content repositories may develop a policy that data past a certain age is automatically culled from the repository, to put a cap on storage usage. Using the feedback metadata to gauge usefulness, relevance and value, content repositories can determine if the material should be kept in the repository instead of being culled.

Demotion to lower tier storage: Some content repositories, such as news sites, or social media sites, amass massive amounts of data where it is difficult to predict when that data might have some usefulness, relevance and value to someone, even old data, so removing the old data is rarely an option. However, the feedback metadata identifies the usefulness, relevance and value of the material and can help a content repository decide (manually or automatically) to demote relatively less relevant material to second, third, or lower tier storage, that perhaps operate at a lower performance level than primary or first tier storage, and thus cost far less to maintain. For relatively less relevant material, it is likely acceptable for the user to wait an additional increment of time to load such material from lower-tier storage, leaving the primary or first tier storage for relatively more relevant material.

The feedback metadata, and the effectiveness data stored therein, may be used in other ways as well.

Cloud Computing Environment

FIG. 1 is a pictorial representation of an illustrative cloud computing environment 100 used for implementing the system for storing and retrieving meeting and presentation effectiveness data, according to one embodiment.

As shown, a cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

The computing nodes 102 and/or computing devices 104A-N perform various functions and steps as described in more detail below.

System and Method Implementation

Figure 2:
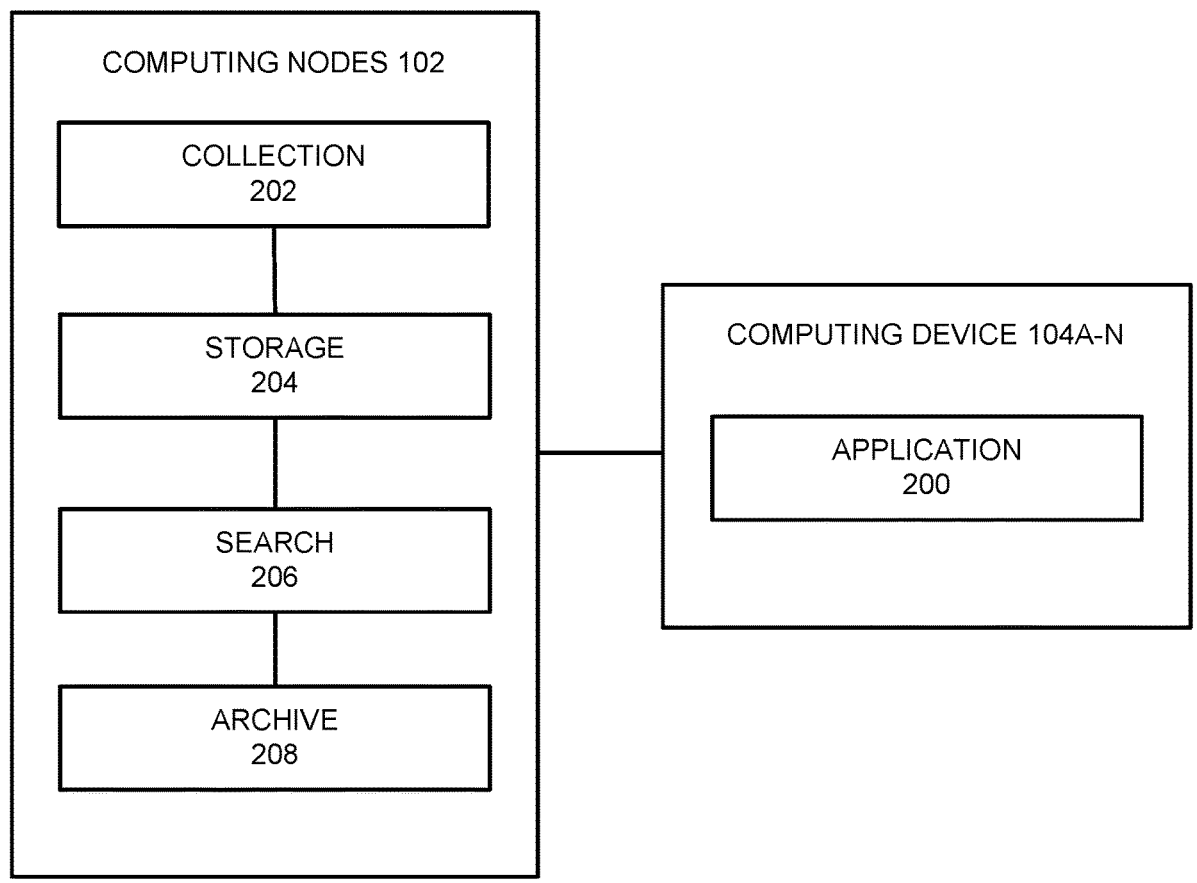
FIG. 2 is a block diagram illustrating how a system for storing and retrieving meeting and presentation effectiveness data is implemented, according to one embodiment.

FIG. 2 is a block diagram illustrating how the system and method for storing and retrieving meeting and presentation effectiveness data is implemented, according to one embodiment. In this embodiment, the system and method are implemented by:

a user viewing the meeting or presentation material using an application 200 on the computing device 104A-N, wherein the application 200 allows the user to generate feedback on the material, as well as search for the material based on that feedback; and the computing nodes 102 performs a plurality of functions or steps 202-208 that accept the feedback from the application 200 on the computing device 104A-N and store the feedback in the files for the meeting or presentation material, and that accept queries from the application 200 on the computing device 104A-N and retrieve the files for the meeting or presentation material in response to those queries.

These functions and steps are described in more detail below.

In a Collection function 202, the computing nodes 102 perform the function or step of collecting material associated with the meeting or presentation, as well as effectiveness data for the material. In one embodiment, the material comprises documents, presentations, audio, video and other media.

The effectiveness data comprises, for example, active or passive feedback to the material. In one embodiment, the effectiveness data comprises:

live meeting or presentation feedback, such as a score that is based on aggregating responses of an audience from the meeting or presentation, wherein the score is averaged over each meeting or presentation of the material;

tagging or voting on the material;

ratings accumulated or averaged across each content repository where the material is stored, such as the number of "likes" for the material;

the number of views or downloads of the material;

the number of times at least a portion of the material is copied;

the number of times one or more portions of the material is bookmarked;

popular portions of the material, such as portions viewed, paused or replayed;

recency of activity; or other actions with regard to the material.

In one embodiment, the effectiveness data is updated in response to an action being taken on the material, to reflect that action's effect on the material.

In a Storage function 204, the computing nodes 102 perform the function or step of storing the effectiveness data as feedback metadata along with the meeting or presentation material in a file, wherein the feedback metadata comprises an updateable and searchable record of the effectiveness data. In one embodiment, the effectiveness data is used to create a relevance score for keywords found within the material that enhances the use of other search criteria.

In a Search function 206, the computing nodes 102 perform the function or step of searching the material associated with the meeting or presentation based on the feedback metadata, thereby allowing a user to search the material based on the effectiveness data as well as its content. Specifically, the feedback metadata is used to search the material based on the material's usefulness, relevance and value to other users. The material's usefulness, relevance and value are tracked using the feedback metadata over the lifespan of the material.

In an Archive function 208, the computing nodes 102 perform the function or step of archiving or purging the material from at least one content repository, based on the feedback metadata. The feedback metadata described by this invention gives content repositories the metrics necessary to decide what to do with material of lesser usefulness, relevance and value.

These functions or steps 202-208 may be repeated as necessary, and any one or more of the functions or steps 202-208 may be omitted as required.

Data Structure

Figure 3:
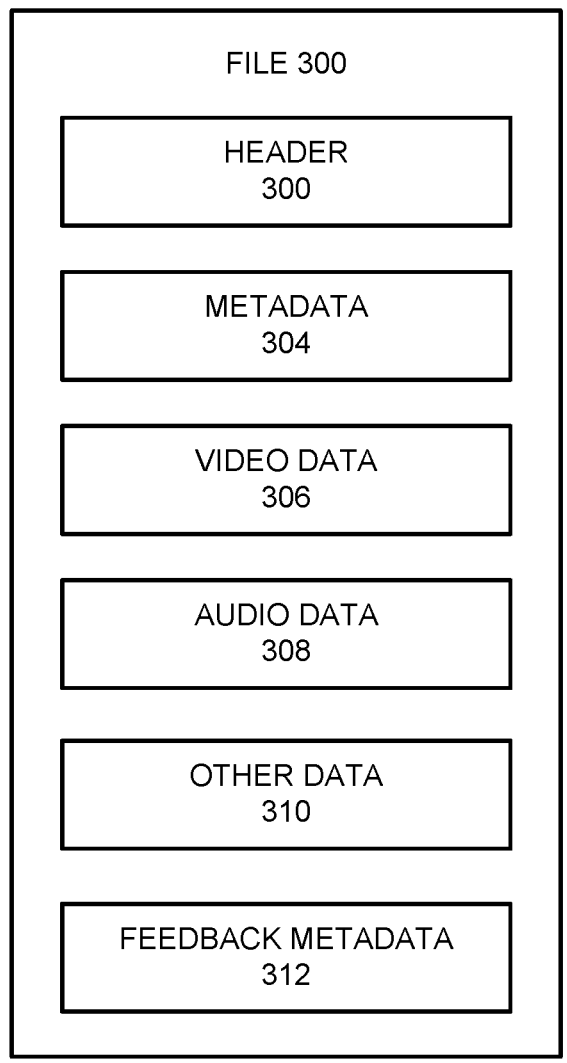
FIG. 3 is a block diagram illustrating how the meeting and presentation effectiveness data is stored and retrieved from feedback metadata in a file, according to one embodiment.

FIG. 3 is a block diagram illustrating how the meeting and presentation effectiveness data is stored and retrieved from a file 300, according to one embodiment. In this embodiment, the file 300 includes a header 302, metadata 304, (optional) video data 306, (optional) audio data 308, (optional) other data 310, and feedback metadata 312.

The header 302 typically includes pointers, flags and other descriptive information.

The metadata 304 includes general information about the file 300 and its contents, such as date created, date of last modification, owner, keywords, etc.

The video data 306, audio data 308, and other data 310, store the material associated with the meeting or presentation, such as documents, presentations, audio, video and other media.

The feedback metadata 312 stores the effectiveness data resulting from any feedback generated by a user, for example, when viewing the meeting or presentation material. In one embodiment, the feedback metadata 312 is updated in response to an action being taken with regard to the material, to reflect that action's effect on the material.

When performing the Search function 204, the feedback metadata 312 comprises an updateable and searchable record of the effectiveness data gathered about the material, thereby allowing a user to search the material based on the effectiveness data as well as other criteria.

When performing the Archive function 208, the feedback metadata 312 allows owners of the meeting and presentation material to track the usefulness, relevance and value of the material over its lifespan, allowing the owner to adjust the material, or even to archive the meeting if it is no longer of any value. Material of lesser usefulness, relevance and value can be culled from a repository, or moved to archival storage, to save on storage costs and prevent clutter. The feedback metadata 312 gives content repositories the metrics necessary to decide what to do with the material.

Statutory Subject Matter

It can be seen that the present invention provides a number of benefits and advantages. These benefits and advantages include improvements to the technology or technical field of managing meeting and presentation material, and more specifically, providing for a system for storing and retrieving meeting and presentation effectiveness data. These benefits and advantages also include improvements to the functioning of the devices themselves, including the cloud computing environment 100 generally and the computing nodes 102 specifically, as well as the computing devices 104A-N, as compared to prior computer-implemented methods and systems of managing meeting and presentation material.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring again to FIG. 1, illustrative cloud computing environment 100 is depicted. As shown, cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds as described hereinabove, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

Figure 4:
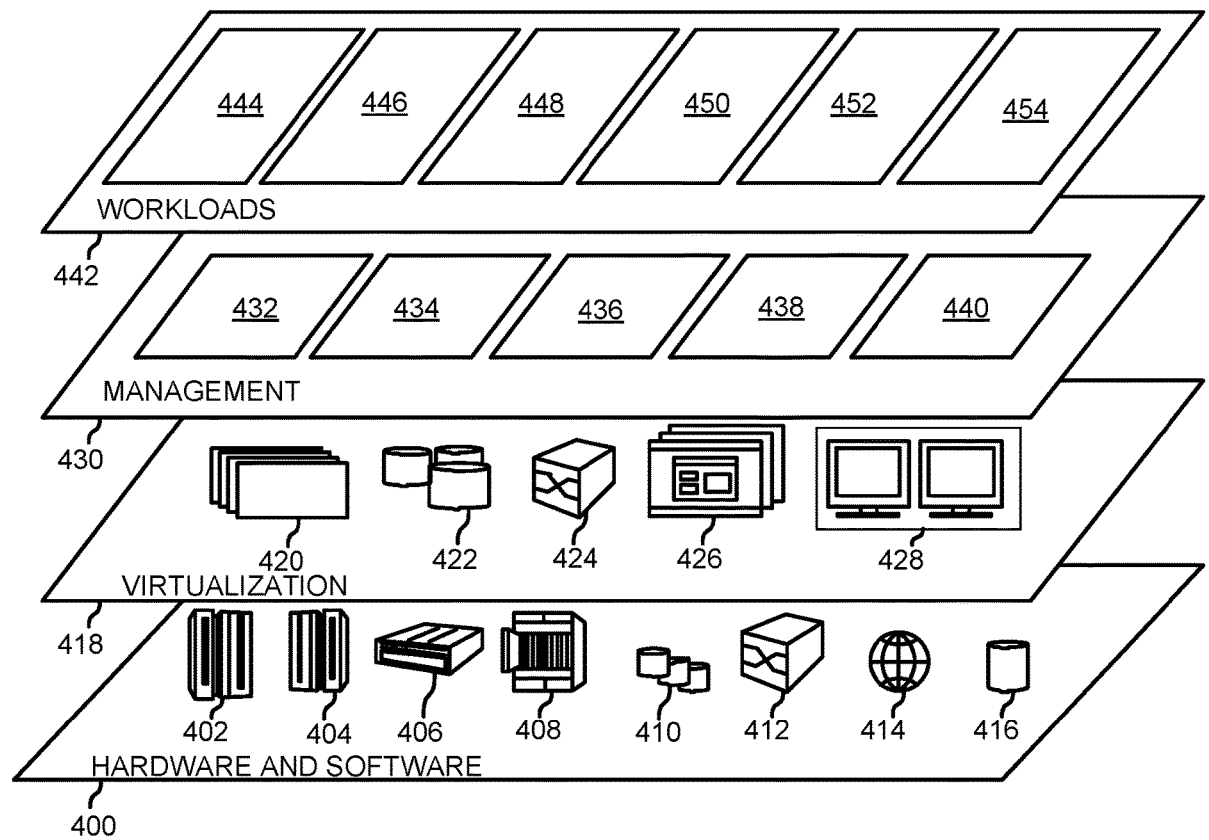
FIG. 4 illustrates a set of functional abstraction layers provided by the cloud computing environment.

Referring now to FIG. 4, a set of functional abstraction layers provided by cloud computing environment 100 (FIG. 1) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include: one or more computers such as mainframes 402; RISC (Reduced Instruction Set Computer) architecture based servers 404; servers 406; and blade servers 408; storage devices 410; and networks and networking components 412. In some embodiments, software components include network application server software 414 and database software 416.

Virtualization layer 418 provides an abstraction layer from which the following examples of virtual entities may be provided: virtual servers 420; virtual storage 422; virtual networks 424, including virtual private networks; virtual applications and operating systems 426; and virtual clients 428.

In one example, management layer 430 may provide the functions described above. Resource provisioning 432 provides dynamic procurement of computing resources and other resources that are utilized to perform tasks within the cloud computing environment 100. Metering and pricing 434 provide cost tracking as resources are utilized within the cloud computing environment 100, and billing or invoicing for consumption of these resources. In one example, these resources may include application software licenses. Security provides identity verification for cloud consumers and tasks, as well as protection for data and other resources. User portal 436 provides access to the cloud computing environment 100 for consumers and system administrators. Service level management 438, which includes containers, provides cloud computing resource allocation and management such that required service levels are met. Service Level Agreement (SLA) planning and fulfillment 440 provide pre-arrangement for, and procurement of, cloud computing resources for which a future requirement is anticipated in accordance with an SLA.

Workloads layer 442 provides examples of functionality for which the cloud computing environment 100 may be utilized. Examples of workloads, tasks and functions which may be provided from this layer include: mapping and navigation 444; software development and lifecycle management 446; virtual classroom education delivery 448; data analytics processing 450; transaction processing 452; etc. More specifically, this layer includes the workloads, tasks and functions for providing a system for storing and retrieving meeting and presentation effectiveness data 454 as described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented system, comprising:
one or more computers programmed for storing and retrieving effectiveness data by:
receiving the effectiveness data for material presented to an audience, wherein the effectiveness data is based on user behavior with the material presented, wherein the user behavior includes bookmarking a portion of the material and copying and pasting content from the material;
generating feedback metadata based on the effectiveness data, wherein the feedback metadata aggregates and rates the effectiveness data to identify popular portions of the material, wherein a predetermined number of the popular portions of the material are identified;
storing the feedback metadata in a file with the material;
wherein the feedback metadata comprises an updateable and searchable record of the effectiveness data for the material, thereby allowing a user to search the material based on the effectiveness data as well as its content;
tracking the material's usefulness, relevance and value using the feedback metadata over a lifespan of the material; and
archiving or purging the material using the feedback metadata stored in the file based on the material's usefulness, relevance and value.

2. The system of claim 1, wherein the material comprises documents, presentations, audio, video or other media associated with a meeting or presentation.

3. The system of claim 1, wherein the effectiveness data comprises active or passive feedback on the material.

4. The system of claim 1, wherein the effectiveness data comprises:
live meeting or presentation feedback,
tagging or voting associated with a file in one or more content repositories,
ratings accumulated or averaged across each content repository where a file is stored,
number of views or downloads of a file from one or more content repositories,
number of copies made from a file,
number of times one or more portions of a file have been bookmarked,
most popular portions of a file, or
recency of any activity for a file.

5. The system of claim 1, wherein the effectiveness data is used to create a relevance score for keywords found within the material.

6. The system of claim 1, wherein the feedback metadata is updated in response to an action being taken on the material, to reflect that action's effect on the effectiveness data.

7. The system of claim 1, wherein the feedback metadata is aggregated or averaged across multiple copies of the material found in different repositories.

8. The system of claim 7, wherein the multiple copies of the material found in the different repositories are defined by a unique identifier for the material across the multiple copies.

9. The system of claim 1, further comprising searching the material using the feedback metadata stored in the file.

10. The system of claim 9, wherein the material is searched to find content based on the material's usefulness, relevance and value provided through the effectiveness data.

11. A computer-implemented method, comprising:
storing and retrieving effectiveness data in one or more computers by:
receiving the effectiveness data for material presented to an audience, wherein the effectiveness data is based on user behavior with the material presented, wherein the user behavior includes bookmarking a portion of the material and copying and pasting content from the material;
generating feedback metadata based on the effectiveness data, wherein the feedback metadata aggregates and rates the effectiveness data to identify popular portions of the material, wherein a predetermined number of the popular portions of the material are identified;
storing the feedback metadata in a file with the material;
wherein the feedback metadata comprises an updateable and searchable record of the effectiveness data for the material, thereby allowing a user to search the material based on the effectiveness data as well as its content;
tracking the material's usefulness, relevance and value using the feedback metadata over a lifespan of the material; and
archiving or purging the material using the feedback metadata stored in the file based on the material's usefulness, relevance and value.

12. The method of claim 11, wherein the effectiveness data comprises active or passive feedback on the material associated with a meeting or presentation.

13. The method of claim 11, wherein the effectiveness data comprises:
live meeting or presentation feedback,
tagging or voting associated with a file in one or more content repositories,
ratings accumulated or averaged across each content repository where a file is stored,
number of views or downloads of a file from one or more content repositories,
number of copies made from a file,
number of times one or more portions of a file have been bookmarked,
most popular portions of a file, or
recency of any activity for a file.

14. The method of claim 11, wherein the feedback metadata is updated in response to an action being taken on the material, to reflect that action's effect on the effectiveness data.

15. The method of claim 11, wherein the feedback metadata is aggregated or averaged across multiple copies of the material found in different repositories.

16. The method of claim 11, further comprising searching the material using the feedback metadata stored in the file, wherein the material is searched to find content based on the material's usefulness, relevance and value provided through the effectiveness data.

17. A computer program product, the computer program product comprising a non-transitory computer readable storage medium having program instructions embodied therewith, the program instructions executable by one or more computers to cause the computers to perform a method, comprising:
    storing and retrieving effectiveness data by:
        receiving the effectiveness data for material presented to an audience, wherein the effectiveness data is based on user behavior with the material presented, wherein the user behavior includes bookmarking a portion of the material and copying and pasting content from the material;
        generating feedback metadata based on the effectiveness data, wherein the feedback metadata aggregates and rates the effectiveness data to identify popular portions of the material, wherein a predetermined number of the popular portions of the material are identified;
    storing the feedback metadata in a file with the material;
    wherein the feedback metadata comprises an updateable and searchable record of the effectiveness data for the material, thereby allowing a user to search the material based on the effectiveness data as well as its content;
    tracking the material's usefulness, relevance and value using the feedback metadata over a lifespan of the material; and
    archiving or purging the material using the feedback metadata stored in the file based on the material's usefulness, relevance and value.

* * * * *